(12) United States Patent
Oshida et al.

(10) Patent No.: US 9,589,194 B2
(45) Date of Patent: Mar. 7, 2017

(54) DRIVING ASSISTANCE DEVICE AND IMAGE PROCESSING PROGRAM

(71) Applicant: HONDA MOTOR CO., LTD., Minato-ku, Tokyo (JP)

(72) Inventors: Kei Oshida, Utsunomiya (JP); Takashi Watanabe, Shioya-gun (JP); Haruhiko Nishiguchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 14/647,319

(22) PCT Filed: Nov. 8, 2013

(86) PCT No.: PCT/JP2013/080229
§ 371 (c)(1),
(2) Date: May 26, 2015

(87) PCT Pub. No.: WO2014/129026
PCT Pub. Date: Aug. 28, 2014

(65) Prior Publication Data
US 2015/0302259 A1    Oct. 22, 2015

(30) Foreign Application Priority Data

Feb. 21, 2013   (JP) ................................ 2013-032009

(51) Int. Cl.
*G06K 9/00*     (2006.01)
*B60R 1/00*     (2006.01)
(Continued)

(52) U.S. Cl.
CPC ............ *G06K 9/00805* (2013.01); *B60R 1/00* (2013.01); *G06K 9/46* (2013.01); *G06K 9/52* (2013.01);
(Continued)

(58) Field of Classification Search
CPC .................................................. G06K 9/00805
See application file for complete search history.

(56) References Cited

U.S. PATENT DOCUMENTS

| 7,161,616 B1* | 1/2007 | Okamoto | B60R 1/00 348/148 |
| 7,786,898 B2* | 8/2010 | Stein | B60R 1/00 340/436 |

(Continued)

FOREIGN PATENT DOCUMENTS

| JP | 10948282 A | 2/1997 |
| JP | 2007329793 A | 12/2007 |

(Continued)

OTHER PUBLICATIONS

Chen et al (NPL: Real-Time Approaching Vehicle Detection in Blind Spot Area, IEEE, 2009).*
International Search Report of PCT/JP2013/080229 with a mailing date of Dec. 17, 2013.
Office Action mailed May 31, 2016 corresponding to Japanese Patent Application No. 2015-501270.

*Primary Examiner* — Oneal R Mistry
(74) *Attorney, Agent, or Firm* — Carrier Blackman & Associates, P.C.; Joseph P. Carrier; Jeffrey T. Gedeon

(57) ABSTRACT

A driving assistance device includes: an imaging unit configured to image surroundings of a vehicle, an image processing unit configured to perform processing on the image imaged by the imaging unit and to generate a display image, and a display unit configured to display the display image generated by the image processing unit. The image processing unit, in response to a set condition, among areas in which the image imaged by the imaging unit is divided, generates a display image in which a visibility of a display area corresponding to a first area which is an imaging area at a side far from the vehicle is lower than a visibility of an ordinary display image thereof.

13 Claims, 12 Drawing Sheets

(51) Int. Cl.
   *G06K 9/46*   (2006.01)
   *G06K 9/52*   (2006.01)
   *G06T 7/20*   (2006.01)
   *G06T 3/40*   (2006.01)

(52) U.S. Cl.
   CPC ............... *G06T 3/40* (2013.01); *G06T 7/20*
       (2013.01); *B60R 2300/306* (2013.01); *G06K*
       *2009/4666* (2013.01)

(56) References Cited

U.S. PATENT DOCUMENTS

| | | | |
|---|---|---|---|
| 2011/0032357 A1* | 2/2011 | Kitaura | B60R 1/00 348/148 |
| 2012/0249789 A1* | 10/2012 | Satoh | G06K 9/00805 348/143 |
| 2012/0257056 A1* | 10/2012 | Otuka | G06T 1/0007 348/148 |
| 2012/0327238 A1* | 12/2012 | Satoh | B60R 1/00 348/148 |
| 2013/0038735 A1 | 2/2013 | Nishiguchi et al. | |
| 2013/0066611 A1 | 3/2013 | Yamada | |

FOREIGN PATENT DOCUMENTS

| | | |
|---|---|---|
| JP | 2008-022125 A | 1/2008 |
| JP | 2008004990 A | 1/2008 |
| JP | 2008027138 A | 2/2008 |
| JP | 2008-205644 A | 9/2008 |
| JP | 2009-040107 A | 2/2009 |
| JP | 2009040108 A | 2/2009 |
| JP | 2010135998 A | 6/2010 |
| JP | 2010137697 A | 6/2010 |
| WO | 2011/118125 A1 | 9/2011 |
| WO | 2011/155030 A1 | 12/2011 |

\* cited by examiner

DRIVING ASSISTANCE DEVICE AND IMAGE PROCESSING PROGRAM

TECHNICAL FIELD

The present invention relates to a driving assistance device and an image processing program.

Priority is claimed on Japanese Patent Application No. 2013-032009, filed on Feb. 21, 2013, the content of which is incorporated herein by reference.

BACKGROUND ART

In the related art, a driving assistance device is known, which includes means for imaging that can image a rear side area of a vehicle and a blind area such as an area outside of a visible range of a side mirror adjacent to the rear side area, and means for displaying that displays the image imaged by the means for imaging such that the imaged image can be visible to a driver. By enlarging the area within the visible range of the side mirror and compressing the blind area outside of the visible range of the side mirror, the driving assistance device eliminates discomfort to the driver when viewing the door mirror and a monitor, and makes the perception of distance with respect to another vehicle when viewing the another vehicle by the door mirror coincident with that by the monitor.

CITATION LIST

Patent Document

[Patent Document 1] Japanese Unexamined Patent Application, First Publication No. 2008-22125

SUMMARY OF INVENTION

Technical Problem

The technology disclosed in Patent Document 1 is focused on generating a display screen which is close to the appearance in the door mirror, and regarding the area outside the visible range of the door mirror, only the compressed image is displayed. For this reason, in a specific situation in which it is highly necessary to make a side area far from the vehicle visible to the driver, sometimes it is not possible to make the area more clearly visible to the driver than in an ordinary situation.

Aspects of the present invention have been made in consideration of such circumstances, and have an object to provide a driving assistance device and an image processing program in which it is possible to make an imaging area far from the vehicle clearly visible to the driver in the specific situation.

Solution to Problem

In order to achieve an object by solving the problems described above, the present invention adopts following means.

(1) A driving assistance device in an aspect of the present invention includes an imaging unit configured to image surroundings of a vehicle, an image processing unit configured to perform processing on the image imaged by the imaging unit and generates a display image, and a display unit configured to display the display image generated by the image processing unit. The image processing unit, in a case where a set condition is not satisfied, among the images imaged by the imaging unit, generates the display image in which a visibility of the display area corresponding to a first area which is an imaging area at a side far from the vehicle is decreased so as to be lower than a visibility of the display area corresponding to a second area which is an imaging area at a side close to the vehicle, and in a case where a set condition is satisfied, generates the display image in which the visibility of the display area corresponding to the first area is improved compared to the case where the set condition is not satisfied.

According to the aspect (1) described above, in a specific situation, it is possible to make the display area far from the vehicle clearly visible to the driver.

(2) In the aspect (1) described above, the image processing unit may change the visibility by changing luminance, brightness, saturation, contrast, resolution, or combinations thereof in the display area corresponding to the first area.

In a case of (2), since the elements that act as direct stimulus to the eyes of the driver can be decreased, it is possible to sufficiently decrease the fluid stimulus.

(3) In the aspect (1) or (2) described above, the imaging unit may be mounted on the vicinity of a door mirror of the vehicle and may image the rear side of the vehicle. The first area may be an area in which an angle formed by an imaging direction and a central axis of the vehicle is equal to or greater than a predetermined angle among the images imaged by the imaging unit, and the second area may be an area in which the angle formed by the imaging direction and the direction parallel to the central axis of the vehicle is smaller than the predetermined angle among the images imaged by the imaging unit.

(4) In the aspects of any one of (1) to (3) described above, the set condition may include a situation in which a specific switch is operated among switches mounted on the vehicle.

(5) In the aspect (4) described above, the specific switch may be a switch for operating a direction indicator.

(6) In the aspects of any one of (1) to (5) described above, the set condition may include a situation in which the vehicle travels a predetermined area near an intersection.

(7) In the aspects of any one of (1) to (6) described above, the set condition may include a situation in which a steering angle of the vehicle is equal to or greater than a predetermined value.

(8) In the aspects of any one of (1) to (7) described above, the set condition may include a situation in which there is a guidance to turn right or left or to change lanes to the right or left by a navigation device mounted on the vehicle.

(9) In the aspects of any one of (1) to (8) described above, the image processing unit may change a degree of visibility based on a speed of the vehicle.

In a case (9) described above, in a case where the fluid stimulus is weak even though the speed of the vehicle is low and the visibility of the display area corresponding to the first area is high, it is possible to make the display area corresponding to the first area clearly visible to the driver. In addition, in a case where the fluid stimulus becomes strong when the speed of the vehicle is high and the visibility of the display area corresponding to the first area is high, it is possible to reduce the visibility of the display area corresponding to the first area and reduce the inconvenience to the driver.

(10) An image processing program in aspect of the present invention causes an image processing unit of the driving assistance device that includes an imaging unit configured to image surroundings of a vehicle, the image processing unit configured to perform processing on the image imaged by the imaging unit and generates a display image, and a display unit configured to display the display image generated by the image processing unit, to determine whether or not a set condition is satisfied, to generate the display image in which a visibility of the display area corresponding to a first area which is an imaging area at a side far from the vehicle is decreased so as to be lower than a visibility of the display area corresponding to a second area which is an imaging area at a side close to the vehicle, among the images imaged by the imaging unit, in a case where a set condition is not satisfied, and to generate the display image in which the visibility of the display area corresponding to the first area is improved compared to the case where the set condition is not satisfied, in a case where a set condition is satisfied.

According to the aspect (10) described above, in the specific situation, it is possible to make the imaging area far from the vehicle clearly visible to the driver.

Advantageous Effects of Invention

According to aspects of the present invention, in a specific situation, it is possible to make the imaging area far from the vehicle clearly visible to the driver.

DESCRIPTION OF EMBODIMENTS

Hereinafter, a driving assistance device and an image processing program in an embodiment of the present invention will be described with reference to the drawings. The driving assistance device in the present embodiment is mounted on a vehicle that travels by being driven by an engine alone, a hybrid vehicle, an electric vehicle (EV) or the like, and displays an imaged image in which, for example, a rear side of the vehicle is imaged by a camera on a position visible by a driver such as an instrument panel. In this way, by viewing a display device, the driver can monitor the rear side area of the vehicle which is usually monitored via right and left door mirrors or is monitored by viewing the rear side of the vehicle with his head deeply toward the rear direction. Therefore, it is possible to reduce a monitoring burden of the driver. In addition, by expanding the imaging area of the camera to a blind area of the door mirrors, the driver can widely monitor the rear side of the vehicle. In this way, the driving assistance device in the present embodiment is a device which relates to a technology that, for example, suitably assists the driver to monitor the rear side of the vehicle, and is a device to solve various problems described below.

First Embodiment

[Configuration]

Figure 1:
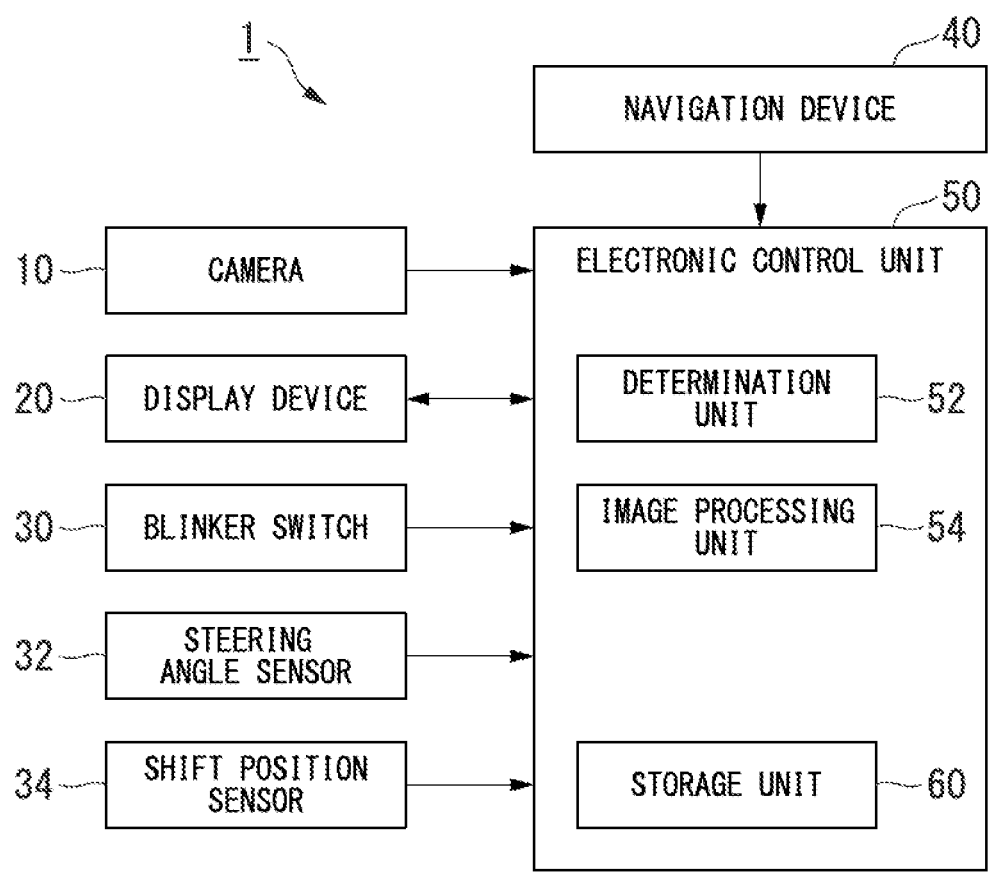
FIG. 1 is a configuration diagram illustrating an example of a configuration of a driving assistance device 1 in a first embodiment of the present invention.

Hereinafter, a driving assistance device 1 in a first embodiment will be described. FIG. 1 is a configuration diagram illustrating an example of a configuration of the driving assistance device 1 in the first embodiment of the present invention. The driving assistance device 1 includes a camera 10 (imaging unit), a display device 20 (display unit), a blinker switch 30 (direction indicator), a steering angle sensor 32, a shift position sensor 34, a navigation device 40, and an electronic control unit (ECU) 50.

Figure 2:
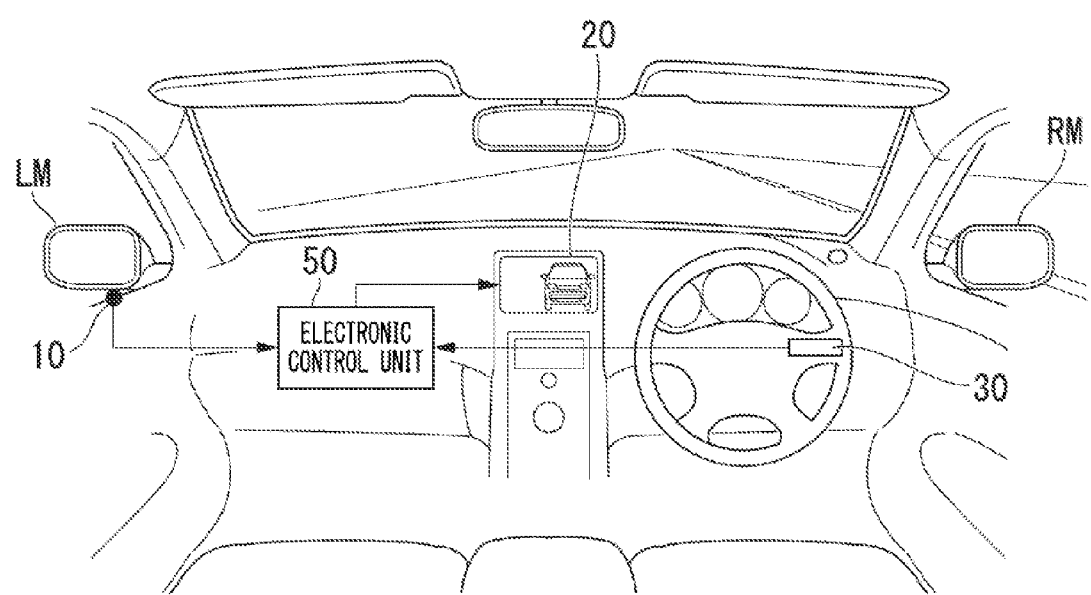
FIG. 2 is a diagram illustrating a positional relationship between a camera 10, a display device 20, a blinker switch 30, and the like seen from the driver's seat.

FIG. 2 is a diagram illustrating a positional relationship between the camera 10, the display device 20, the blinker switch 30, and the like seen from the driver's seat. As illustrated in FIG. 2, the camera 10 is mounted on a housing portion of one door mirror of the vehicle on which the driving assistance device 1 is mounted (hereinafter, referred to as simply a vehicle). The camera 10 may be mounted on any side of the vehicle, and in the description below, the camera 10 is mounted on the left side of the vehicle. The camera 10, for example, is mounted on the lower portion of the left door mirror LM. In addition, the camera 10 may be mounted on an arbitrary position in which the rear side of the vehicle can be imaged such as in the vicinity of a fender mirror not limited to the door mirror. The display device 20 is mounted on an arbitrary position visible by the driver such as the instrument panel of the vehicle. The blinker switch 30 is mounted on a blinker lever provided on a side of a steering wheel.

Figure 3:
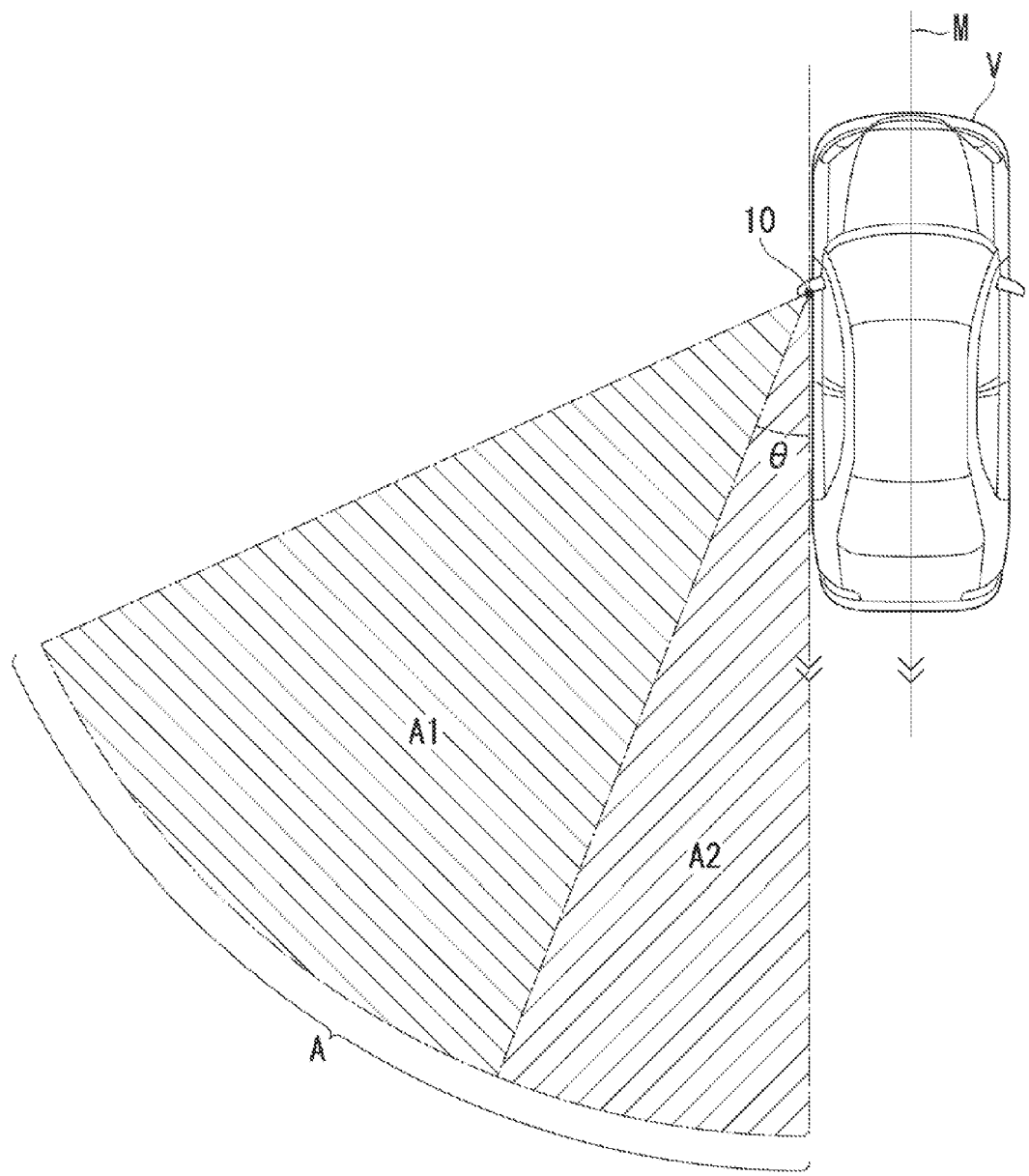
FIG. 3 is a diagram illustrating an example of an imaging area of the camera 10.

The camera 10 is a camera in which a solid-state image sensing device such as a charge coupled device (CCD) or a complementary metal oxide semiconductor (CMOS) is used. The camera 10, for example, images the rear side of the vehicle for each predetermined period, and outputs data of the imaged image (image data) to the electronic control unit 50. FIG. 3 is a diagram illustrating an example of an imaging area of the camera 10. In FIG. 3, an imaging area A by the camera 10 includes an imaging area A1 (first area) in which an angle formed by a central axis M of the vehicle V (in terms of vector, the backward direction) and an imaging direction is equal to or greater than a predetermined angle θ and an imaging area A2 (second area) in which an angle formed by a central axis M of the vehicle V and the imaging direction is smaller than a predetermined angle θ. The imaging area A2 is made to be almost coincident with the area that can be monitored by the driver via the left door mirror. The predetermined angle θ is set value set in advance by experiment or the like.

The description will be made returning back to FIG. 1. The display device 20 is, for example, a liquid crystal display (LCD) device, an organic electroluminescence (EL) display device, or the like. A displayed content on the display device 20 in the present invention is determined by the electronic control unit 50. The display device 20 may function as a touch panel to serve as an input device. In addition, display device 20 may be commonly used by the navigation device 40 and the electronic control unit 50. In addition, display device 20 may be a projection device such as a head up display (HUD).

The blinker switch 30, for example, detects an operation state of a blinker lever for operating a blinker (a direction indicator) by the driver, and outputs a signal indicating the detection result to the electronic control unit 50. The blinker switch 30 outputs the signal indicating any one of a neutral state that the blinker lever is not operated, a state that the blinker lever is operated to the left, and a state that the blinker lever is operated to the right, to the electronic control unit 50.

The steering angle sensor 32, for example, detects a steering angle of the steering wheel operated by the driver, and outputs a signal indicating the detection result to the electronic control unit 50. In addition, the steering angle sensor 32 may detect an angle (actual steering angle) of the steering wheel of the vehicle.

The shift position sensor 34 detects an operating position of a transmission of the vehicle among shift positions of, for example, a first gear, a second gear, D (drive), N (neutral), and B (backward), and outputs a signal indicating the detection result to the electronic control unit 50.

The navigation device 40 includes, for example, a global positioning system (GPS) receiver, a storage device such as a hard disk drive (HDD), a flash memory, or an electrically erasable programmable read-only memory (EEPROM) in which map information is stored, a navigation control device that performs processing of guiding a route to a destination using the above-described devices, and a speaker for a voice output. The GPS receiver detects the position (latitude, longitude, and altitude) of the vehicle by a method of single point positioning or a relative positioning (differential-GPS), or a real time kinematic (RTK). The map information is information in which information of a width of a road, the number of lanes, a slope, a curvature, and the like are added for each section of the road, and the shape of an intersection for each intersection of the road is described. The navigation control device searches for an optimal route from the current position of the vehicle to the destination designated by the driver, and outputs guidance information for turning right or left or guidance information for changing the lane through the speaker such that the vehicle can travel along the route.

The electronic control unit 50 is a control device to which a processing device such as a central processing unit (CPU), a read only memory (ROM) or a flash memory, a non-volatile memory such as a HDD or an EEPROM, a data memory such as a random access memory (RAM), a communication interface, a timer, or the like are connected via a bus. In FIG. 1, the program memory and the data memory are combined to be expressed as a storage unit 60. In addition, the electronic control unit 50 includes a determination unit 52 and an image processing unit 54 as function units that function through the execution of the program stored in the non-volatile memory by the CPU.

The determination unit 52 determines whether or not a set condition which indicates that the vehicle is in a specific traveling situation in which the driver is highly needed to monitor the imaging area A1 (refer to FIG. 3), is satisfied. The specific traveling situation is, for example, a situation in which the driver is attempting to turn left, to change lanes, or is traveling near an intersection. In these situations of traveling, the monitoring vehicles, bicycles, or pedestrians being at the left side is highly needed, and thus, it is highly needed to clearly display the imaging area A1 on the display device 20. The determination unit 52 determines whether or not the vehicle is in the specific traveling situation based on the signal input from the blinker switch 30, the steering angle sensor 32, and the shift position sensor 34 or the control signal input from the navigation device 40. The determination by the determination unit 52 will be described below.

[Generation of Display Image]

The image processing unit 54, for example, performs a horizontal inversion on the imaged data imaged by the camera 10 to make the imaged data coincident with the scene in the door mirror LM seen by the driver, and performs the processing described below, and then, generates the display image displayed on the display device 20. The image processing unit 54 generates the display image by performing the processing tasks different from each other based on the determination result from the determination unit 52. The image data imaged by the camera 10 is stored in a buffer area set in the RAM for each imaging frame, for example, and the display image generated through the processing performed on this stored image by the image processing unit 54 is output to the display device 20 for each frame, for example. The display device 20 performs the display of the moving picture by sequentially displaying the display images input from the electronic control unit 50.

(1) In a case where the vehicle is not in the specific traveling situation, the image processing unit 54 performs processing of decreasing the visibility of the display area S1 corresponding to the imaging area A1 so as to be lower than the visibility of the display area S2 corresponding to the imaging area A2, and generates the display image. Here, decreasing the visibility is decreasing any of the luminance, brightness, saturation, contrast, and resolution, or the combinations thereof (hereinafter, referred to as luminance or the like). In addition, decreasing the visibility may be making the display area invisible by completely masking the entire area.

Figure 4:
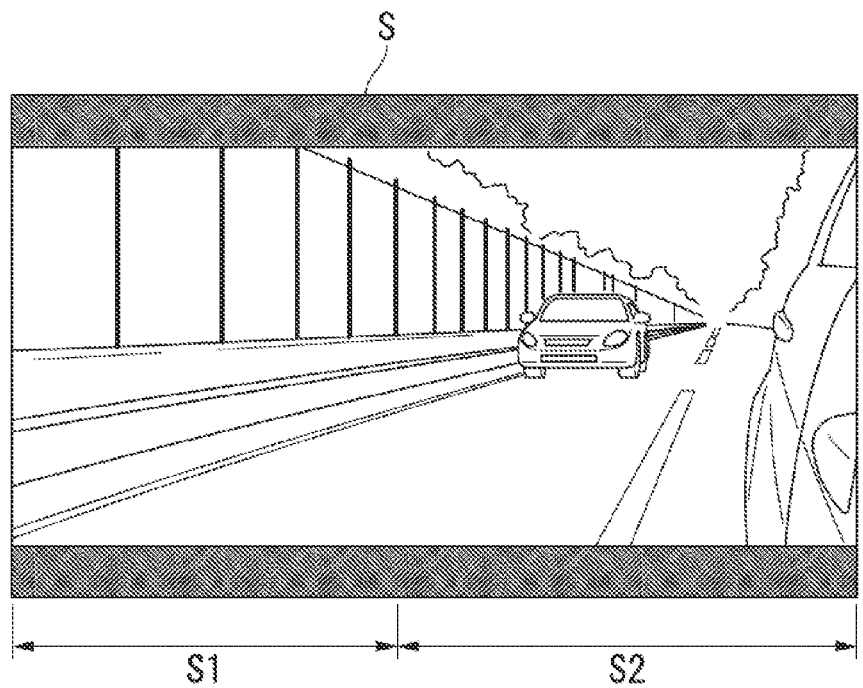
FIG. 4 is a reference diagram illustrating a situation for comparing with a situation in the present embodiment, and is a diagram illustrating an example of a display image S in a case where image data input from the camera 10 is horizontally inverted only and displayed as it is (or in a case where such processing is performed on the entire image).

FIG. 4 is a reference diagram illustrating a situation for comparing with the situation in the present embodiment, and is a diagram illustrating an example of a display image S in a case where image data input from the camera 10 is horizontally inverted only and displayed as it is (or in a case where such processing is performed on the entire image). In the display area S1 illustrated in FIG. 4, since the area separated from the vehicle in a vehicle-width direction is imaged, the amount of movement of the imaging target (a guard rail post, a parked vehicle, a pedestrian, or a building) corresponding to the traveling of the vehicle per each time is large, and thus, a visual fluid stimulus becomes strong. For this reason, if the display area is displayed without performing special processing, there is a case that the driver feels an inconvenience. Therefore, in a case where the vehicle is not in the specific traveling situation, the image processing unit 54 in the present embodiment sets the image data to the display image after performing certain processing on the image data with regard to the display area S2 corresponding to the imaging area A2 and generates the display image S of which the visibility is decreased to be lower than the display area S2 with regard to the display area S1 corresponding to the imaging area A1. The certain processing is processing for adjusting the luminance or the like according to the characteristics of the camera 10 and the characteristics of the display device 20, and this processing may not be performed at all.

Figure 5:
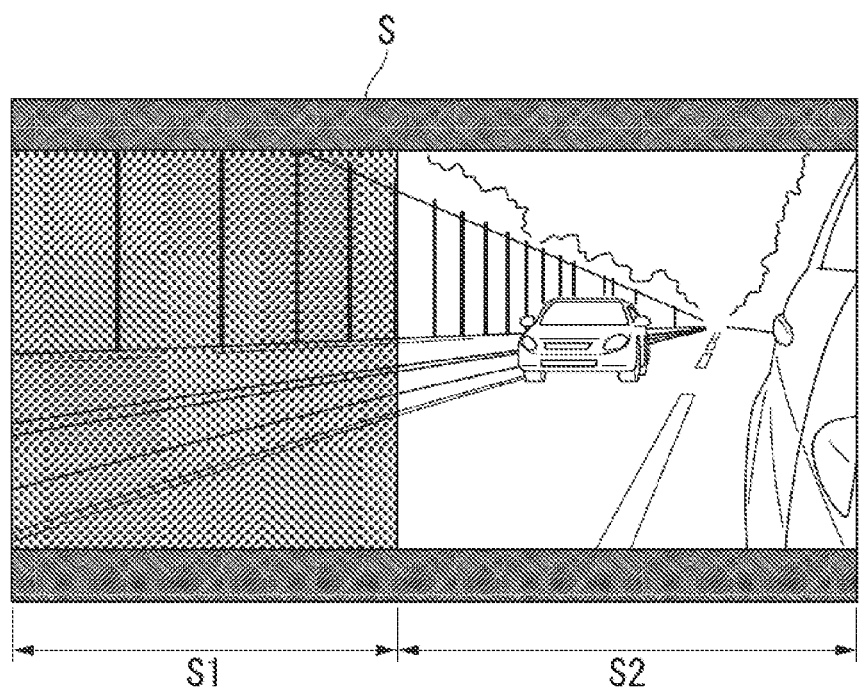
FIG. 5 is a diagram illustrating an example of a display image S in a case where a visibility of a display area S1 corresponding to an imaging area A1 is decreased.

FIG. 5 is a diagram illustrating an example of a display image S in a case where a visibility of a display area S1 corresponding to an imaging area A1 is decreased. By the processing, the driving assistance device 1 in the present embodiment can suppress the inconvenience to the driver due to the fluid stimulus. On the other hand, with regard to the display area S2, since the visibility in the display area S2 is higher than that in the display area S1, it is possible to achieve the object of displaying the same scene as that of the door mirror LM on the display device 20.

Here, in the device disclosed in above-described Patent Document 1, since a compression rate in the side area far from the vehicle is high, it is considered that the processing is performed for the same purpose, but in some cases, the fluid stimulus cannot be sufficiently decreased by increasing the compression rate alone. In contrast, in the driving assistance device 1 in the present embodiment, since the element such as luminance or the brightness that acts as a direct stimulus to the eyes of the driver is decreased, it is possible to sufficiently decrease the fluid stimulus.

(2) In a case where the vehicle is in the specific traveling situation, the image processing unit 54 generates the display image of which the visibility in the display area S1 is higher than that in the above-described (1). In this case, with regard to the entire imaging area A, the image processing unit 54 performs the same processing as the specific processing performed on the display area S2 in the case of (1) to generate the display image S. Not limited to this, in a case where the vehicle is in the specific traveling situation, the image processing unit 54 may make the luminance or the like of the display areas S1 and S2 different.

The display image S in the case where the visibility in the display area S1 corresponding to the imaging area A1 is improved becomes the same as that illustrated, for example, in FIG. 4. By this processing, in a case where the vehicle is in the specific traveling situation, the image corresponding to the blind area that is on the outside of the area which can be seen via the door mirror LM is clearly displayed. In this way, in the specific situation, it is possible to make the imaging area A1 far from the vehicle clearly visible to the driver. As a result, the area that can be monitored by the driver can be expanded more than that of the vehicle in the related art.

Figure 6:
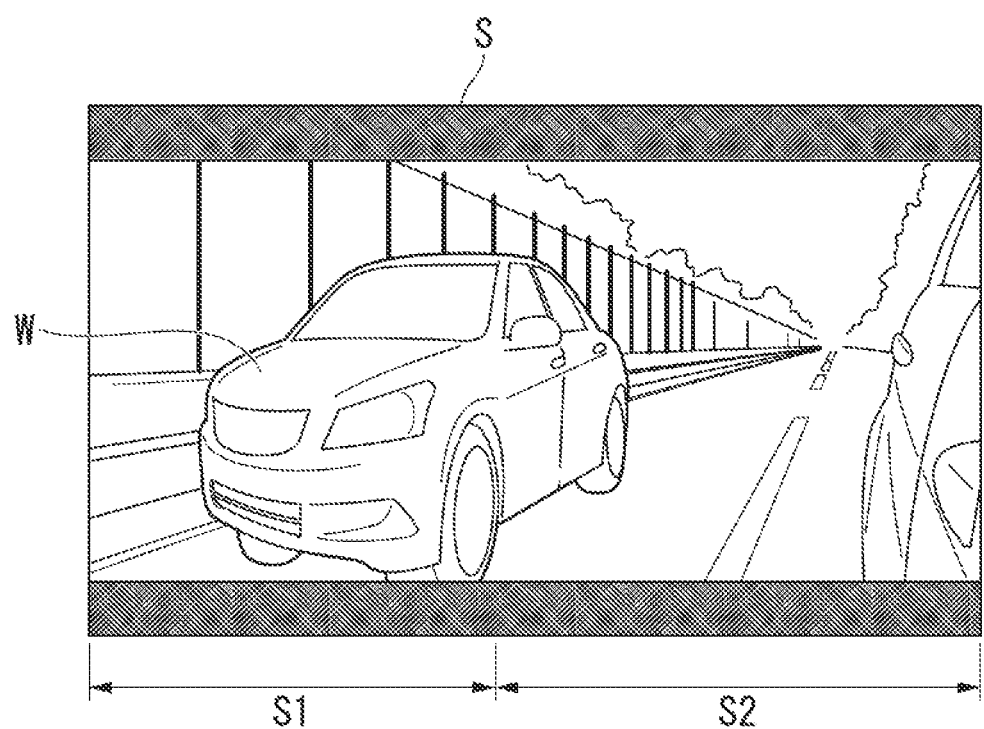
FIG. 6 is a diagram illustrating an example of a display image S in a case where a vehicle is as a monitoring target object in the imaging area A1.

(3) In a case where the vehicle is in the specific traveling situation and a monitoring target object (a vehicle or a pedestrian) is in the imaging area A1, the image processing unit 54 generates the display image of which the visibility of the display area S1 is higher than that in the above-described (2). FIG. 6 is a diagram illustrating an example of a display image S in a case where a vehicle W which is a monitoring target object, is in the imaging area A1. In this case, the image processing unit 54 performs the processing of making the luminance or the like of the display area S1 higher than that in the case of (2). In this way, in a case where the necessity for the driver to monitor the imaging area A1 is high, it is possible to make the display area S1 far from the vehicle further clearly visible to the driver. The determination whether or not the monitoring target object is in the imaging area A1 may be performed using an analysis of the image imaged by the camera 10 (edge points are extracted and if there is a rectangular area formed by linking the edge points and having a size equal to or greater than a certain size, then, the rectangular area is determined to be a vehicle being within a predetermined distance), or may be performed by detecting the existence and the relative position of the monitoring target object by providing a radar or the like separate from the configuration illustrated in FIG. 1.

[Processing Flow]

Figure 7:
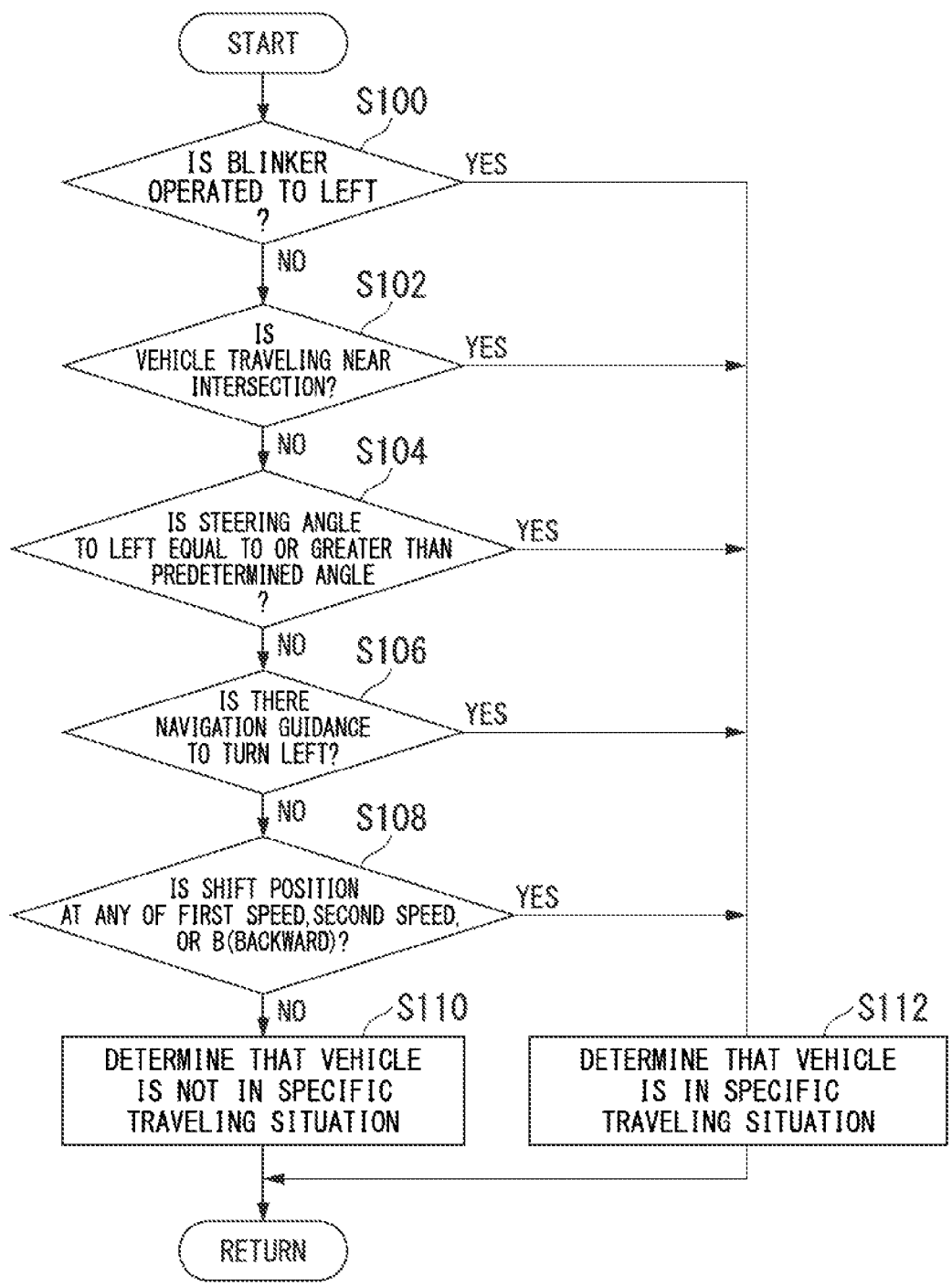
FIG. 7 is a flowchart illustrating an example of a processing flow which is executed by a determination unit 52 in the present embodiment.

Hereinafter, a processing flow in accordance with the details of the determination by the determination unit 52 and a processing flow by the image processing unit 54 will be described. FIG. 7 is a flowchart illustrating an example of a processing flow which is executed by a determination unit 52 in the present embodiment. The processing tasks in the flowchart in FIG. 7 are repeatedly executed during a predetermined period.

First, the determination unit 52 determines whether or not the blinker is operated to the left based on the signal input from the blinker switch 30 (STEP S100). In a case where the blinker is operated to the left, the determination unit 52 determines that the vehicle is in the specific traveling situation (satisfies the set condition) (STEP S112).

Figure 8:
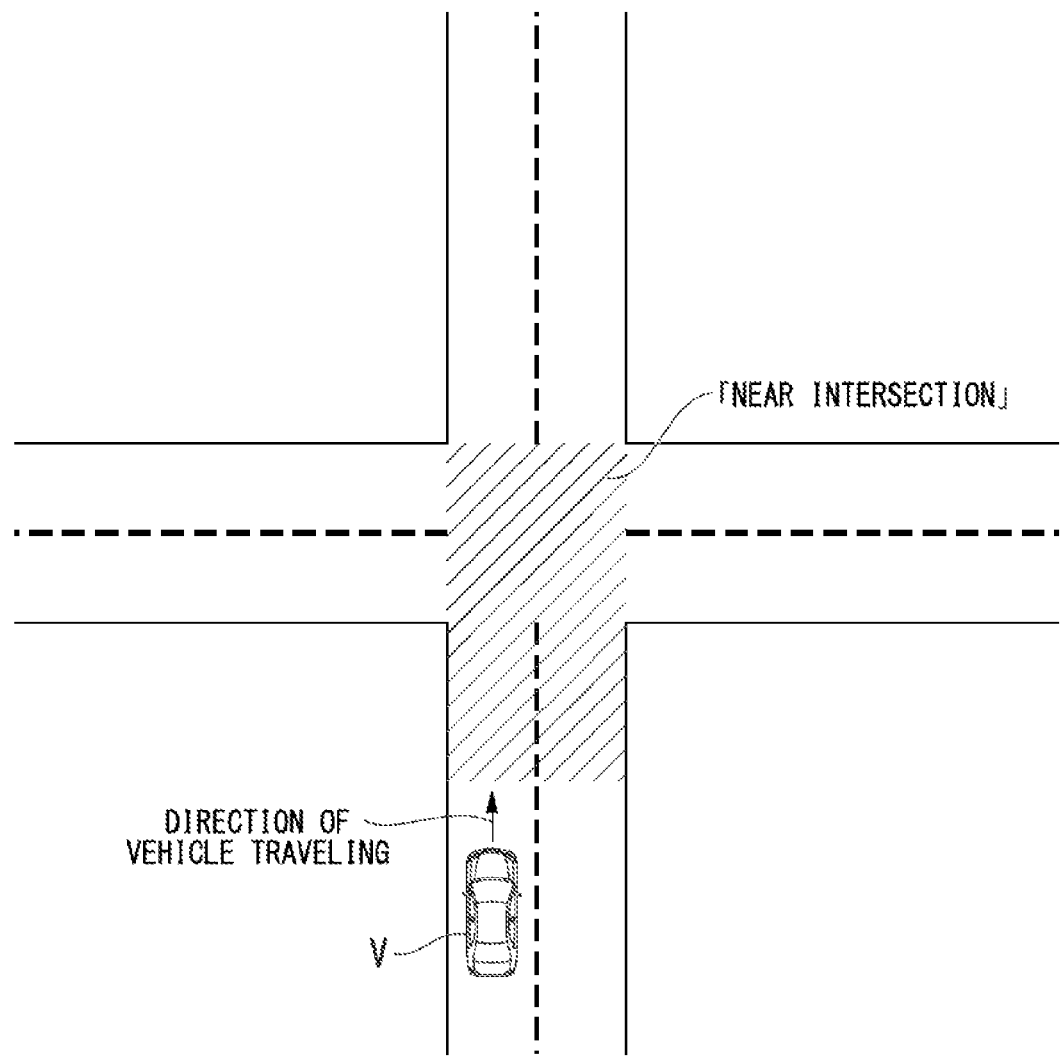
FIG. 8 is a diagram illustrating an example of an area defined as near an intersection.

In a case where the blinker is not operated to the left, the determination unit 52 determines whether or not the vehicle is traveling near the intersection (STEP S102). In a case where the vehicle is traveling near the intersection, the determination unit 52 determines that the vehicle is in the specific traveling situation (STEP S112). The determination unit 52 determines whether or not the vehicle is traveling near the intersection by a signal input from the navigation device 40. The navigation device 40 repeatedly determines whether or not the vehicle is traveling near the intersection by comparing the position of the vehicle specified by the GPS receiver and the map information, and outputs the determination results to the electronic control unit 50. "Near the intersection" is defined as, for example, the areas including the area within the intersection and the area in front of the intersection. FIG. 8 is a diagram illustrating an example of the area defined as near the intersection.

In a case where the vehicle is not traveling near the intersection, the determination unit 52 determines whether or not the steering angle to the left direction (steering angle or the actual steering of the vehicle) is equal to or greater than a predetermined angle based on a signal input from the steering angle sensor 32 (STEP S104). In a case where the steering angle to the left direction (steering angle or the actual steering of the vehicle) is equal to or greater than the predetermined angle, the determination unit 52 determines that the vehicle is in the specific traveling situation (STEP S112).

In a case where the steering angle to the left direction is smaller than the predetermined angle, the determination unit 52 determines whether or not there is guidance from the navigation device 40 to turn left or to change lanes to the left direction (or, whether or not it is the time within a predetermined time from the starting of the guidance) (STEP S106). In a case where there is the guidance from the navigation device 40 to turn left or to change lanes to the left direction, the determination unit 52 determines that the vehicle is in the specific traveling situation (STEP S112).

In a case where there is no guidance from the navigation device 40 to turn left or to change lanes to the left direction, the determination unit 52 determines whether or not the shift position is at any one of the first gear, the second gear, or the B (backward) based on a signal input from the shift position sensor 34 (STEP S108). In a case where the shift position is at any one of the first gear, the second gear, or the B (backward), the determination unit 52 determines that the vehicle is in the specific traveling situation (STEP S112). In this processing, it is considered that, in a case where the shift position is at any one of the first gear, the second gear or the B (backward), since the speed of the vehicle is not so high, the fluid stimulus by the display image S is not so strong, and the necessity for monitoring the surroundings of the vehicle increases when, for example, the vehicle slowly travels the street.

In a case where any of the determination through STEPs S100 to S108 is "No", the determination unit 52 determines that the vehicle is not in the specific traveling situation (the set condition is not satisfied) (STEP S110).

The determination result from the determination unit 52 is stored in an area in the RAM to which the image processing unit 54 can refer. Among the determination processing tasks in STEPs S100 to S108 in the flowchart in FIG. 7, a portion thereof may be omitted or any other processing tasks may be added. For example, in a case where the vehicle speed is lower than a predetermined speed, the vehicle may be determined to be in the specific traveling situation.

Figure 9:
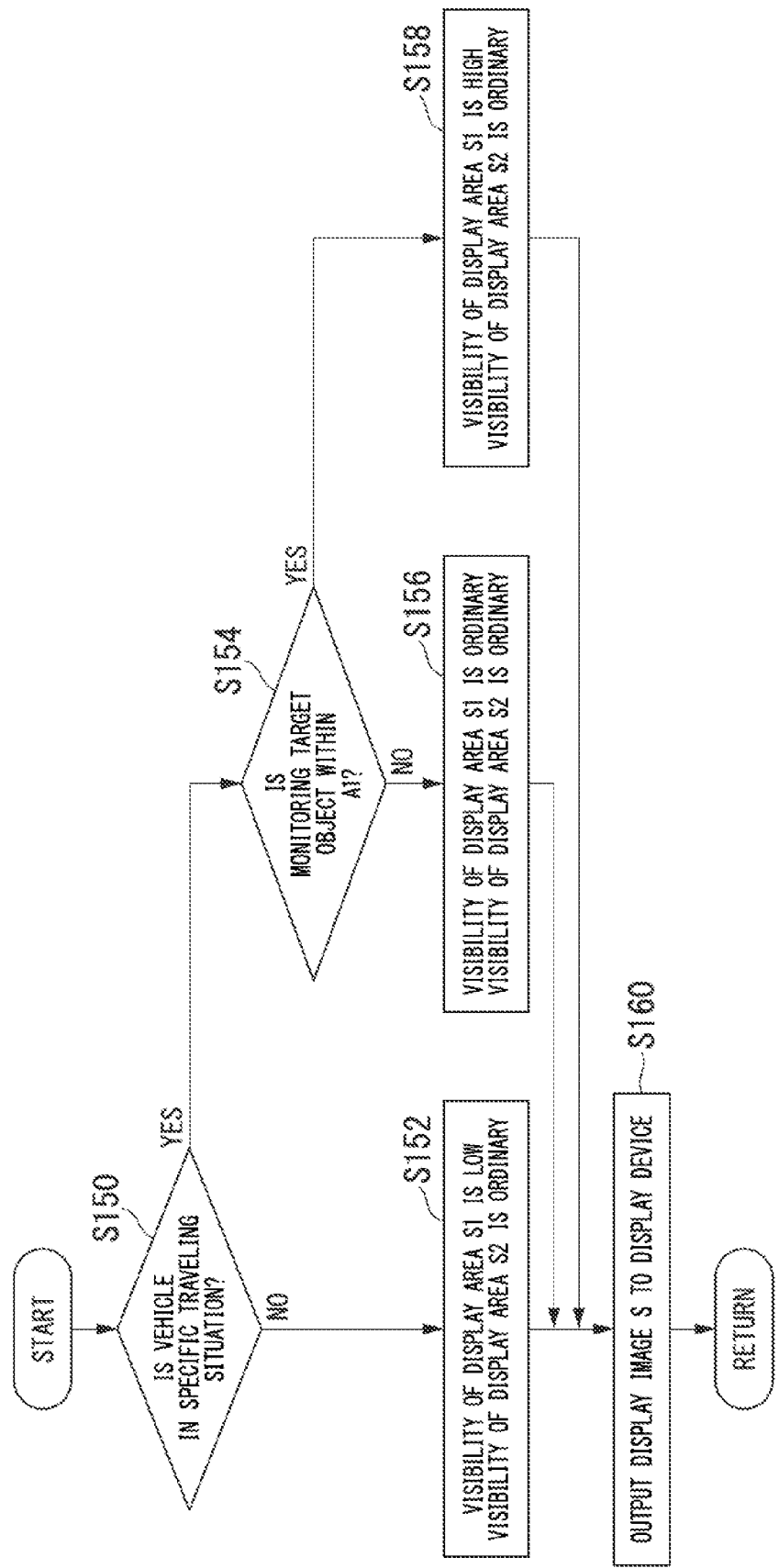
FIG. 9 is a flowchart illustrating an example of a processing flow which is executed by an image processing unit 54 in the present embodiment.

FIG. 9 is a flowchart illustrating an example of a processing flow which is executed by the image processing unit 54 in the present embodiment. The flow in the flowchart in FIG. 9 is repeatedly executed for every processing of the data of one frame, for example.

First, the image processing unit 54 determines whether or not the determination unit 52 determines that the vehicle is in the specific traveling situation (STEP S150). In a case where the it is determined by the determination unit 52 that the vehicle is not in the specific traveling situation, the image processing unit 54 generates the display image in which the visibility of the display area S1 is low and the visibility of the display area S2 is ordinary (STEP S152).

In a case where the it is determined by the determination unit 52 that the vehicle is in the specific traveling situation, the image processing unit 54 determines whether or not the monitoring target object is within the imaging area A1 (STEP S154). In a case where it is determined that the monitoring target object is not within the imaging area A1, the image processing unit 54 generates the display image in which the visibility of the display area S1 and the visibility of the display area S2 are ordinary (STEP S156). In STEP S156, the visibility of the display area S1 may be higher or may be lower than the visibility of the display area S2. In the description in FIG. 9, the expressions "low", "ordinary", and "high" are the relative expressions, and thus, it is sufficient for the application of the present invention if the high-and-low relativity of the necessary visibility (the visibility of the display area S1 is lower than the visibility of the display area S2 in STEP S152, and the visibility of the display area S1 in STEP S156 is higher than the visibility of the display area S1 in STEP S152) is satisfied.

In a case where it is determined that monitoring target object is within the imaging area A1, the image processing unit 54 generates the display image in which the visibility of the display area S1 is high and the visibility of the display area S2 is ordinary (STEP S158).

When the processing tasks in STEPs 150 to 158 end, the image processing unit 54 outputs the generated display image S to the display device 20 (STEP S160).

[Summary]

According to the driving assistance device 1 in the present embodiment described above, the display image S in which the luminance or the like of the display area S1 is improved compared to the case where the vehicle is not in the specific traveling situation. As a result, in the specific situation, it is possible to make the imaging area far from the vehicle clearly visible to the driver. As a result, the area that can be monitored by the driver can be expanded more than that of the vehicle in the related art.

In addition, according to the driving assistance device 1 in the present embodiment, in the case where the vehicle is not in the specific traveling situation, the display image S of which the visibility of the display area S1 is lower than that of the display area S2 is generated. As a result, the inconvenience to the driver due to the fluid stimulus can be suppressed. On the other hand, with regard to the display area S2, since the visibility in the display area S2 is higher than that in the display area S1, it is possible to achieve the object of displaying the same scene as the scene seen via the door mirror LM on the display device 20.

In addition, according to the driving assistance device 1 in the present embodiment, since the element such as luminance or the brightness that acts as a direct stimulus to the eyes of the driver is decreased, it is possible to sufficiently decrease the fluid stimulus.

In addition, according to the driving assistance device 1 in the present embodiment, in a case where there is the monitoring target object in the imaging area A1 and it is highly necessary for the driver to monitor the imaging area A1, it is possible to make the display area S1 far from the vehicle clearly visible to the driver.

[Mounting the Camera on the Right Side]

In the description in the first embodiment, the camera 10 is mounted on the left door mirror LM. However, the camera 10 may be mounted on the right door mirror RM. In addition, the camera 10 may be mounted on a position other than the door mirrors, or may be mounted on both of the door mirrors LM and RM as in a third embodiment described below.

In a case where the camera 10 is mounted on the right door mirror RM, the determination in STEP S100 in the flowchart in FIG. 7 is changed to read as "determines whether or not the blinker is operated to the right". In addition, the determination in STEP S104 is changed to read as "determines whether or not the steering angle to the right direction (steering angle or the actual steering of the vehicle) is equal to or greater than a predetermined angle". In addition, the determination in STEP S106 is changed to read as "determines whether or not there is guidance from the navigation device 40 to turn right or to change lanes to the right direction".

Second Embodiment

Figure 10:
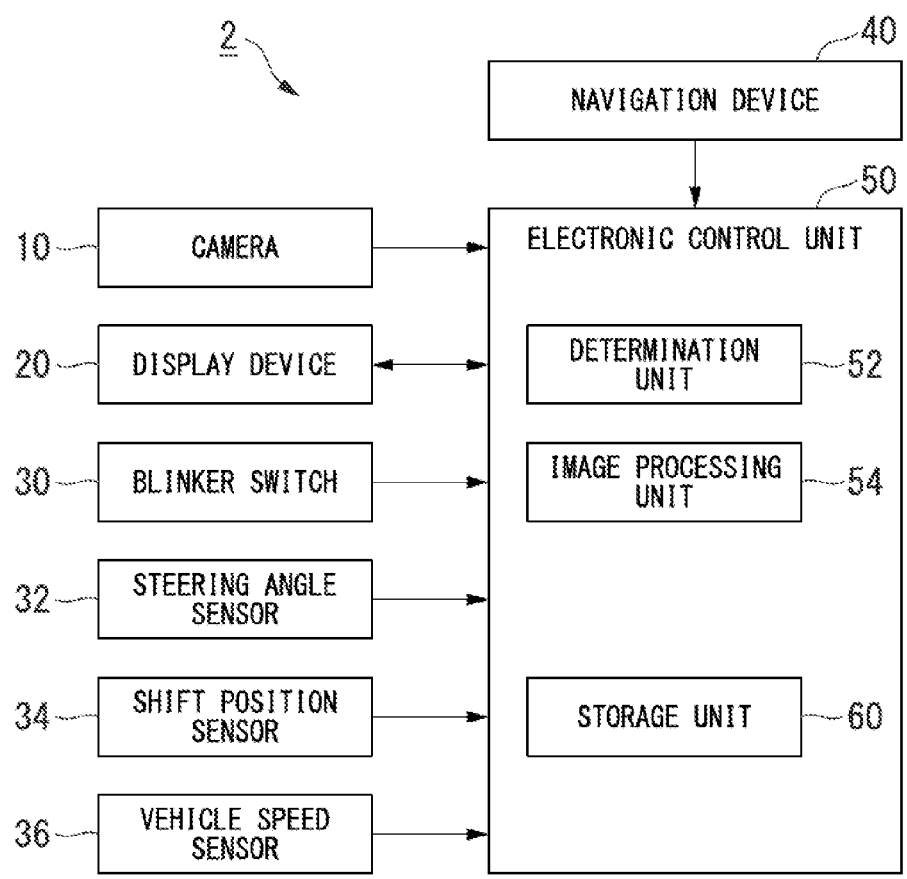
FIG. 10 is a configuration diagram illustrating an example of a configuration of a driving assistance device 2 in a second embodiment of the present invention.

Hereinafter, a driving assistance device 2 in the second embodiment will be described. FIG. 10 is a configuration diagram illustrating an example of a configuration of the driving assistance device 2 in the second embodiment. The driving assistance device 2 includes a vehicle speed sensor 36 in addition to what the configuration of the driving assistance device 1 in the first embodiment includes. Hereinafter, the points common to the first embodiment will not be described again, and only the points different from those in the first embodiment will be described.

The vehicle speed sensor 36 includes, for example, wheel speed sensors that are respectively mounted on four wheels of the vehicle and a calculator that generates a signal indicating the vehicle speed according to the output of the wheel speed sensor. The vehicle speed sensor 36 outputs a signal indicating the vehicle speed to the electronic control unit 50. In addition, the vehicle speed sensor 36 may be mounted on the transmission of the vehicle.

The processing tasks of the determination unit 52 are the same as those in the first embodiment, and thus, the description thereof will not be repeated.

Figure 11:
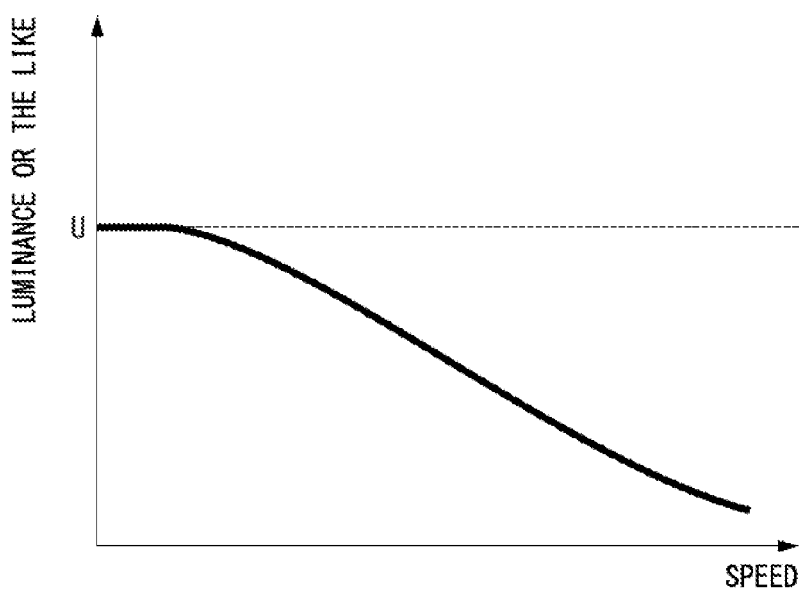
FIG. 11 is a diagram illustrating a relationship between a vehicle speed and a visibility (luminance and the like) of display area S1 in the second embodiment.

The image processing unit 54 in the second embodiment changes the visibility of the display area S1 based on the vehicle speed input from the vehicle speed sensor 36 in the case where the vehicle is not in the specific traveling situation. FIG. 11 is a diagram illustrating a relationship between the vehicle speed and the visibility (luminance and the like) of the display area S1 in the second embodiment. As illustrated in FIG. 11, the image processing unit 54 in the second embodiment reduces the visibility of the display area S1 as the vehicle speed increases. The upper limit value U of the luminance or the like is set as the same as the luminance or the like in the case where the vehicle is in the specific traveling situation.

By the processing, in a case where the fluid stimulus is weak even when the vehicle speed is low and the visibility of the display area S1 is high, it is possible to make the display area S1 clearly visible to the driver. As a result, for example, in a case where the vehicle travels the street at a low speed, it is possible to cope with the increase of the necessity for monitoring the surroundings of the vehicle. In addition, reversely, in a case where the fluid stimulus becomes strong when the vehicle speed is high and the visibility of the display area S1 is high, it is possible to reduce the inconvenience to the driver by reducing the visibility of the display area S1.

According to the driving assistance device 2 in the present embodiment described above, the same effect as in the driving assistance device 1 in the first embodiment can be achieved, and additionally, in a case where the fluid stimulus is weak even when the vehicle speed is low and the visibility of the display area S1 is high, it is possible to make the display area S1 clearly visible to the driver. In addition, in a case where the fluid stimulus becomes strong when the vehicle speed is high and the visibility of the display area S1 is high, it is possible to reduce the inconvenience to the driver by reducing the visibility of the display area S1.

Third Embodiment

Figure 12:
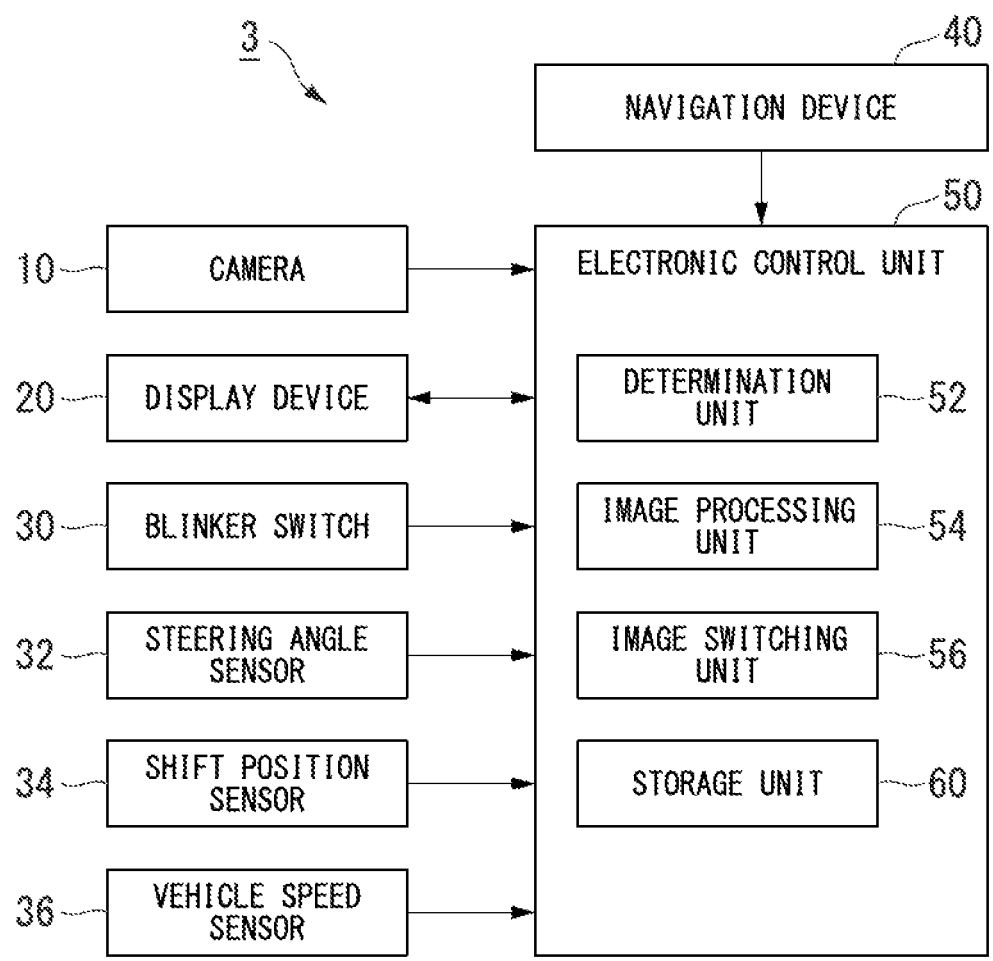
FIG. 12 is a configuration diagram illustrating an example of a configuration of a driving assistance device 3 in a third embodiment of the present invention.

Hereinafter, a driving assistance device 3 in the third embodiment will be described. FIG. 12 is a configuration diagram illustrating an example of a configuration of the driving assistance device 3 in the third embodiment of the present invention. The driving assistance device 3 in the third embodiment includes a left camera 12 and a right camera 14 that are respectively mounted on right and left sides of the vehicle. The left camera 12 is mounted, for example, on the lower portion of the left door mirror LM and the right camera 14 is mounted, for example, on the lower portion of the right door mirror RM. Not limited to this, the left camera 12 and the right camera 14 may be mounted on any arbitrary position at which the left rear side and the right rear side of the vehicle can respectively be imaged.

In addition, the electronic control unit 50 in the third embodiment further includes an image switching unit 56 as a function unit that functions by the CPU executing the program stored in the non-volatile memory. Hereinafter, the points common to the first embodiment and the second embodiment will not be described again, and the description will be focused on the different points.

Figure 13:
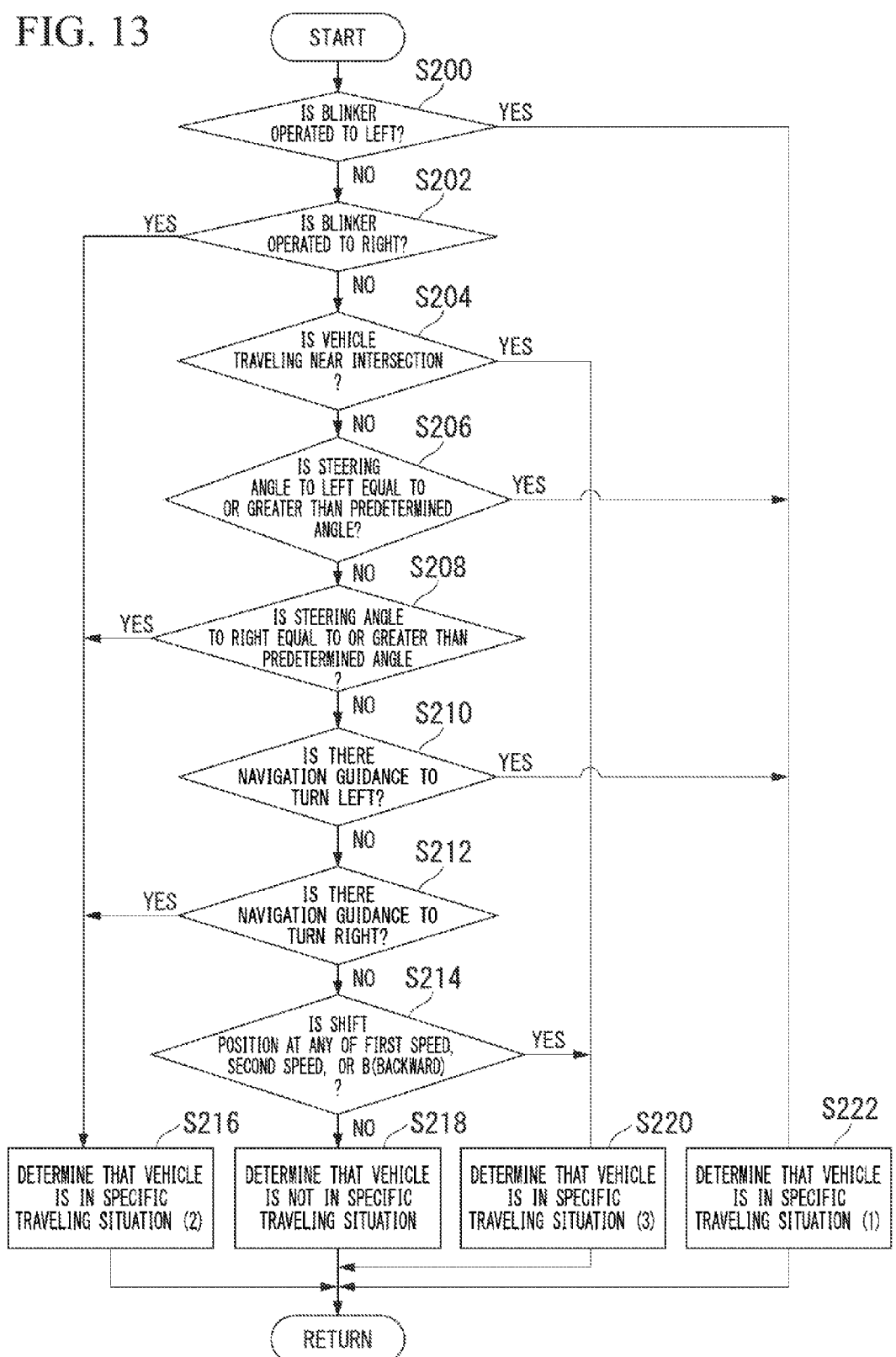
FIG. 13 is a flowchart illustrating an example of a processing flow which is executed by the determination unit 52 in the third embodiment.

FIG. 13 is a flowchart illustrating an example of a processing flow which is executed by the determination unit 52 in the third embodiment. The processing tasks in the flowchart in FIG. 13 are repeatedly executed during a predetermined period, for example.

First, the determination unit 52 determines whether or not the blinker is operated to the left based on the signal input from the blinker switch 30 (STEP S200). In a case where the blinker is operated to the left, the determination unit 52 determines that the vehicle is in the specific traveling situation (1) (STEP S222). Here, the specific traveling situation (1) means a situation in which the necessity of monitoring the side far from the vehicle in the left side of the vehicle is high. Handling of this situation will be described below.

In a case where the blinker is not operated to the left, the determination unit 52 determines whether or not the blinker is operated to the right based on the signal output from the blinker switch 30 (STEP S202). In a case where the blinker is operated to the right, the determination unit 52 determines that the vehicle is in the specific traveling situation (2) (STEP S216). Here, the specific traveling situation (2) means a situation in which the necessity of monitoring the side far from the vehicle on the right side of the vehicle is high.

In a case where the blinker is not operated to the right, the determination unit 52 determines whether or not the vehicle is traveling near the intersection (STEP S204). In a case where the vehicle is traveling near the intersection, the determination unit 52 determines that the vehicle is in the specific traveling situation (3) (STEP S220). Here, the specific traveling situation (3) means a situation in which the necessity of monitoring the side far from the vehicle is high regardless of whether any side of the vehicle.

In a case where the vehicle is not traveling near the intersection, the determination unit 52 determines whether or not the steering angle to the left direction is equal to or greater than a predetermined angle based on a signal input from the steering angle sensor 32 (STEP S206). In a case where the steering angle to the left direction is equal to or greater than the predetermined angle, the determination unit 52 determines that the vehicle is in the specific traveling situation (1) (STEP S222).

In a case where the steering angle to the left direction is smaller than the predetermined angle, the determination unit 52 determines whether or not the steering angle to the right direction is equal to or greater than a predetermined angle based on a signal input from the steering angle sensor 32 (STEP S208). In a case where the steering angle to the right direction is equal to or greater than the predetermined angle, the determination unit 52 determines that the vehicle is in the specific traveling situation (2) (STEP S216).

In a case where the steering angle to the right direction is smaller than the predetermined angle, the determination unit 52 determines whether or not there is guidance from the navigation device 40 to turn left or to change lanes to the left direction (STEP S210). In a case where there is the guidance from the navigation device 40 to turn left or to change lanes to the left direction, the determination unit 52 determines that the vehicle is in the specific traveling situation (1) (STEP S222).

In a case where there is no guidance from the navigation device 40 to turn left or to change lanes to the left direction, the determination unit 52 determines whether or not there is guidance from the navigation device 40 to turn right or to change lanes to the right direction (STEP S212). In a case where there is the guidance from the navigation device 40 to turn right or to change lanes to the right direction, the determination unit 52 determines that the vehicle is in the specific traveling situation (2) (STEP S216).

In a case where there is no guidance from the navigation device 40 to turn right or to change lanes to the right direction, the determination unit 52 determines whether or not the shift position is at any one of the first gear, the second gear, or the B (backward) based on a signal input from the shift position sensor 34 (STEP S214). In a case where the shift position is at any one of the first gear, the second gear, or the B (backward), the determination unit 52 determines that the vehicle is in the specific traveling situation (3) (STEP S220).

In a case where any of the determination through STEPs S200 to S214 is "No", the determination unit 52 determines that the vehicle is not in the specific traveling situation (the set condition is not satisfied) (STEP S218).

The determination result from the determination unit 52 is stored in an area in the RAM to which the image processing unit 54 can refer. Among the determination processing tasks in STEPs S200 to S214 in the flowchart in FIG. 13, a portion thereof may be omitted or any other processing tasks may be added. For example, in a case where the vehicle speed is lower than a predetermined speed, the vehicle may be determined to be in the specific traveling situation (3).

The image processing unit 54 in the third embodiment performs the same processing as the processing illustrated in FIG. 9 with regard to each of the right and left image data. In a case where the processing in the flowchart in FIG. 9 is performed regarding the left side image data, the processing in STEP S150 is changed to read as "determines whether or not it is determined by the determination unit 52 that the vehicle is in the specific traveling situation (1) or (3)", and in a case where the processing in the flowchart in FIG. 9 is performed regarding the right side image data, the processing in STEP S150 is changed to read as "determines whether or not it is determined by the determination unit 52 that the vehicle is in the specific traveling situation (2) or (3)".

Figure 14:
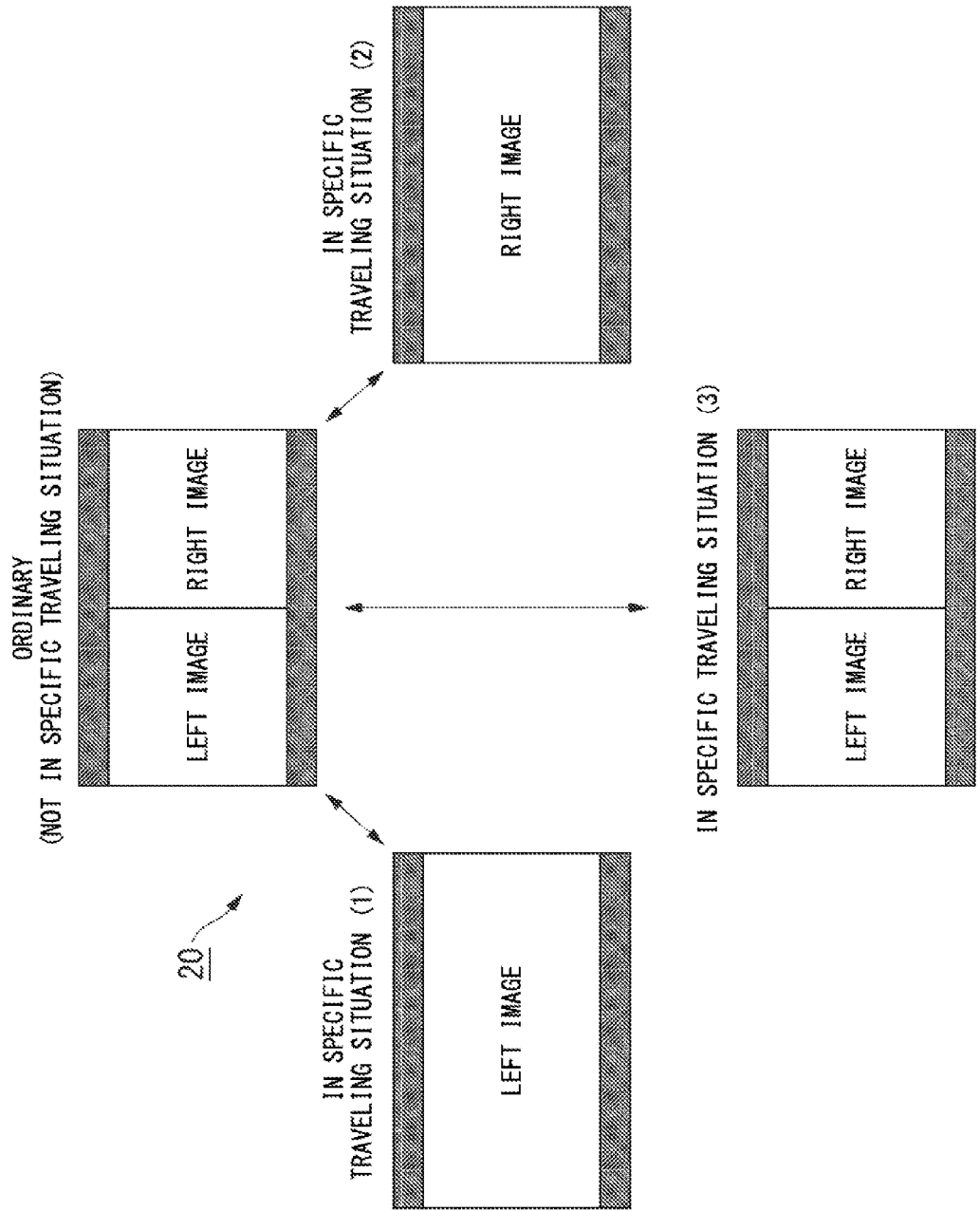
FIG. 14 is an example of a display images on the display device 20 according to situations of traveling of a vehicle.

The image switching unit 56 switches which of the right or left display image is to be displayed on the display device 20 based on the determination result from the determination unit 52. For example, in a case where it is determined that the vehicle is in the specific traveling situation (1), the image switching unit 56 displays only the display image generated from the imaged image of the left camera 12 on the display device 20, in a case where it is determined that the vehicle is in the specific traveling situation (2), the image switching unit 56 displays only the display image generated from the imaged image of the right camera 14 on the display device 20, and in a case where it is determined that the vehicle is in the specific traveling situation (3), the image switching unit 56 displays both the display image generated from the imaged image of the left camera 12 and the display image generated from the imaged image of the right camera 14 on the display device 20. Considering the fact that the left door mirror LM requires a larger movement of line of sight than the right door mirror RM in a case where it is determined that the vehicle is in the specific traveling situation (3), the image switching unit 56 may display the display image generated from the imaged image of the left camera 12 on the display device 20 or may display the display image generated from the imaged image of the left camera 12 in a proportion greater than that of the display image generated from the imaged image of the right camera 14 on the display device 20. In a case where the vehicle is not in the specific traveling situation, the switching of the image may be performed in a manner similar to the case where it is determined that the vehicle is in the specific traveling situation (3). FIG. 14 is an example of the display images on the display device 20 according to situations of traveling of a vehicle. In FIG. 14, the display image generated from the imaged image of the left camera 12 is referred to as the "left image" and the display image generated from the imaged image of the right camera 14 is referred to as the "right image".

According to the driving assistance device 3 in the present embodiment described above, the same effect as in the driving assistance device 1 in the first embodiment and the driving assistance device 2 in the second embodiment can be achieved, and additionally, in a case where the necessity of monitoring any of the left side or the right side alone is high, since the display image of the left side or the right side is selected, it is possible to realize the appropriate monitoring of the surroundings of the vehicle.

In the third embodiment, the image switching unit 56 may be omitted, and both the right and left display images may be displayed at all times with dividing the display screen of the display device 20.

As above, embodiments for implementing the present invention are described using the embodiments. However, the present invention is not limited to the embodiments, and various changes and substitutions can be added within the scope that does not depart from the spirit of the present invention.

For example, in the above-described embodiments, the display image is generated based on the imaged image in which the rear side of the vehicle is imaged. However, a display image that reproduces the scene of the rear side seen via a room mirror may be generated based on the imaged image in which the rear side of the vehicle is imaged, or the display image may be generated based on the imaged image in which the front side of the vehicle is imaged. In the latter case, the imaged image, for example, may be an infrared image at night time.

REFERENCE SIGNS LIST

1, 2, 3 driving assistance device
10 camera (imaging unit)
20 display device (display unit)
30 blinker switch (direction indicator)
32 steering angle sensor
34 shift position sensor
36 vehicle speed sensor
40 navigation device
50 electronic control unit
52 determination unit
54 image processing unit
56 image switching unit
60 storage unit

The invention claimed is:
1. A driving assistance device comprising:
  a single camera configured to image surroundings of a vehicle in a field of view of the single camera with the field of view extending between a side portion of the vehicle and a maximum viewing angle of the single camera and with the field of view divided into a first area and a second area with the second area extending between the side portion of the vehicle and a dividing line and the first area extending between the dividing line and the maximum viewing angle;

an electronic control unit including a processor configured to perform processing on an image imaged by the camera and generate a display image; and a display configured to display the display image generated by the processor, wherein the processor is further configured, in a case where a set operating condition of the vehicle is satisfied, to generate the display image to include ordinary images corresponding to the first and second areas, which are images in which one of a particular image processing and no image processing is performed on the image imaged by the single camera, wherein the processor is further configured, in a case where the set operating condition of the vehicle is not satisfied, to generate the display image to include the ordinary image corresponding to the second area and a processed image corresponding to the first area in which visibility is reduced relative to visibility of the ordinary image corresponding to the first area, and wherein the amount of movement of a target object imaged by the single camera in the first area is larger than that in the second area.

2. The driving assistance device according to claim 1, wherein the processor is further configured to reduce the visibility by changing luminance, brightness, saturation, contrast, resolution, or combinations thereof in the display area corresponding to the first area.

3. The driving assistance device according to claim 1, wherein the single camera is mounted on the vicinity of a door mirror of the vehicle, and wherein the first area is an area in which an angle formed by an imaging direction and a central axis of the vehicle is equal to or greater than a predetermined angle, and the second area is an area in which the angle formed by the imaging direction and the central axis of the vehicle is smaller than the predetermined angle.

4. The driving assistance device according to claim 1, wherein the set operating condition of the vehicle includes a situation in which a specific switch is operated among switches mounted on the vehicle.

5. The driving assistance device according to claim 4, wherein the specific switch is a switch for operating a direction indicator.

6. The driving assistance device according to claim 1, wherein the set operating condition of the vehicle includes a situation in which the vehicle travels a predetermined area near an intersection.

7. The driving assistance device according to claim 1, wherein the set operating condition of the vehicle includes a situation in which a steering angle of the vehicle is equal to or greater than a predetermined value.

8. The driving assistance device according to claim 1, wherein the set operating condition of the vehicle includes a situation in which there is a guidance to turn right or left or to change lanes to the right or left by a navigation device mounted on the vehicle.

9. The driving assistance device according to claim 1, wherein the processor is further configured to change degree of visibility based on a speed of the vehicle.

10. The driving assistance device according to claim 1, wherein the second area is made to be almost coincident with the area which can be monitored by a driver via the door mirror.

11. The driving assistance device according to claim 1, wherein, in a case where the set operating condition of the vehicle is satisfied and a monitoring target object exists in the first area, the visibility of the display area corresponding to the first area is improved compared to that of the ordinary display image.

12. An image processing method, comprising:

imaging surroundings of a vehicle using a single camera having a field of view extending between a side portion of the vehicle and a maximum viewing angle of the single camera and with the field of view divided into a first area and a second area with the second area extending between the side portion of the vehicle and a dividing line and the first area extending between the dividing line and the maximum viewing angle;

determining whether or not a set operating condition of the vehicle is satisfied;

generating, in a case where a set operating condition of the vehicle is satisfied, a display image that includes ordinary images corresponding to the first and second areas, which are images in which one of a particular image processing and no image processing is performed on the image imaged by the single camera;

generating, in a case where the set operating condition of the vehicle is not satisfied, the display image that includes the ordinary image corresponding to the second area and a processed image corresponding to the first area in which visibility is reduced relative to visibility of the ordinary image corresponding to the first area; and displaying the display image, wherein the amount of movement of a target object imaged by the single camera in the first area is larger than that in the second area.

13. The image processing method according to claim 12, wherein:

the single camera is mounted on the vicinity of a door mirror of the vehicle, and the first area is an area in which an angle formed by an imaging direction and a central axis of the vehicle is equal to or greater than a predetermined angle, and the second area is an area in which the angle formed by the imaging direction and the central axis of the vehicle is smaller than the predetermined angle.

* * * * *